Nov. 3, 1925.
W. H. CONKLIN
1,560,411
PIPE CLEVIS
Filed June 6, 1925
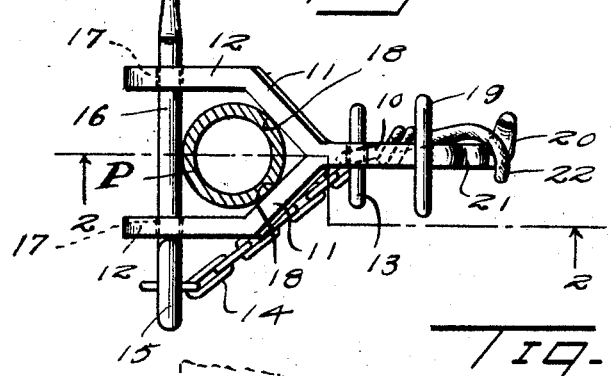
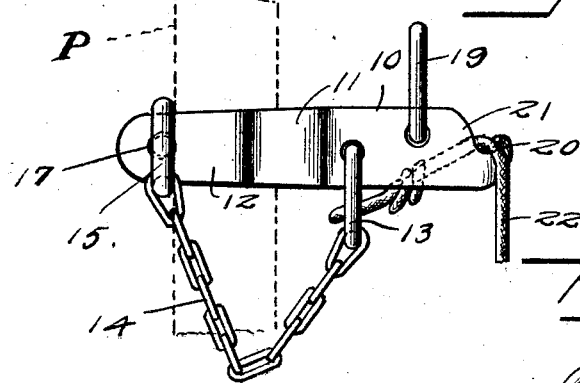
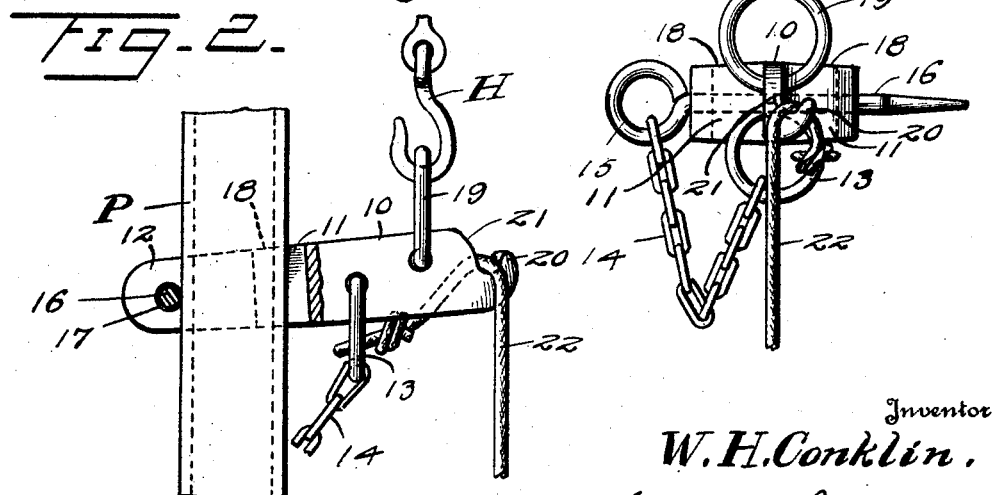
Inventor
W. H. Conklin,
By Watson E. Coleman.
Attorney Patented Nov. 3, 1925.

1,560,411

UNITED STATES PATENT OFFICE.

WILLIAM H. CONKLIN, OF WELLFLEET, NEBRASKA, ASSIGNOR OF ONE-HALF TO JAMES OVENS, OF WELLFLEET, NEBRASKA.

PIPE CLEVIS.

Application filed June 6, 1925. Serial No. 35,423.

*To all whom it may concern:*

Be it known that I, WILLIAM H. CONKLIN, a citizen of the United States, residing at Wellfleet, in the county of Lincoln and State of Nebraska, have invented certain new and useful Improvements in Pipe Clevises, of which the following is a specification, reference being had to the accompanying drawings.

This invention relates to pipe clevises and more particularly to a device for supporting pipes or other cylindrical objects to hoist the same.

An important object of the invention is to provide a device of this character which may be readily adjusted upon the pipe so as to take a grip further down upon the pipe, as when drawing the same from a well or the like.

A further object of the invention is to produce a device of this character which may be very cheaply and readily produced, which will be durable and efficient in service and a general improvement in the art.

These and other objects I attain by the construction shown in the accompanying drawings, wherein for the purpose of illustration is shown a preferred embodiment of my invention and wherein:—

Figure 1 is a plan view of a pipe clevis constructed in accordance with my invention showing the same applied to a pipe;

Figure 2 is a section on the line 2—2 of Figure 1;

Figure 3 is a side elevation of the device in the position in which the clevis is released for vertical movement; and Figure 4 is an end elevation of the clevis showing the manner in which the flexible element is engaged with the hook to shift the clevis to the position shown in Figure 3.

Referring now more particularly to the drawings, the clevis comprises a shank 10 formed at its ends to produce diverging arms 11. The ends of the diverging arms 11 have parallel portions 12 adapted to receive therebetween the pipe P to be hoisted. The shank has attached thereto at its under surface a ring 13 to which is secured a flexible element 14, the end of which is engaged with the eye 15 of a pin 16 directed through openings 17 formed in the outer ends of the parallel portions to prevent escape of the clevis from about the pipe and during the hoisting operation to engage against the pipe and cause the clevis to have a tilting engagement with the pipe, bringing the upper adjacent edges 18 of the diverging arms into engagement with the pipe to bind thereon and fix the clevis against movement longitudinally of the pipe.

Adjacent its outer end, the shank has secured thereto a second ring 19 for engagement by a hoisting element H. The outer extremity of the shank is formed with a hook 20 extending upwardly to one side of the shank from a point adjacent the bottom thereof, the adjacent upper surface of the shank being beveled downwardly to the hook, as at 21.

In the use of the device, the pin 16 is removed and the clevis engaged about the pipe so that the pipe lies between the parallel portions 12 after which the pin is replaced. Strain is then placed on the hoisting element H and since this strain is applied in spaced relation to the pipe and to one side of the center of gravity of the clevis as a whole, the clevis assumes an inclined position, such as illustrated in Figure 2, the upper edges 18 of the diverging arms 11 coming into engagement with a pipe and biting into the pipe to provide a positive grip thereon. To the ring 13, a second flexible element 22 is secured and this flexible element, which is preferably in the form of a rope, forms a means for releasing the clevis and the same cannot be reached for releasing by the hand. The releasing is accomplished by throwing a loop in the rope over the hook 20, the inclined portion 21 serving to guide the rope to the hook. This will provide means for applying strain to the other end of the shank so that it may be thrown downwardly against the action of the hoisting apparatus to relieve the strain of the hoisting apparatus and accordingly to permit and force the clevis to move downwardly upon the pipe until it reaches the desired position thereof.

It will be obvious that a device of this character may be very readily and cheaply produced and is quite as readily applied to the pipe and will provide an efficient hoisting device, the position of which may be changed whenever it is found desirable. It will also be obvious that since the point of engagement of the cable with the shank is outwardly of the point of engagement of the hoisting apparatus with the shank, by providing sufficient strain upon the flexible element 22 to overcome the unbalanced weight of the clevis, the clevis may not only be adjusted downwardly upon the pipe but while this strain is held, the clevis may be adjusted upwardly therewith.

Since the structure is obviously capable of a certain range of change and modification without materially departing from the spirit of my invention, I do not limit myself to such specific structure except as hereinafter claimed.

I claim:—

1. A pipe clevis comprising a shank having at one end thereof diverging arms terminating in parallel portions adapted to straddle the pipe, removable means engaging the ends of the parallel portions for preventing escape of the pipe arranged therebetween, means for engaging a hoisting element with the shank intermediate the ends thereof and a flexible element engaged with the shank inwardly of the point of engagement with the hoisting element and means for engaging the flexible element with the shank at the outer end thereof.

2. A pipe clevis comprising a shank having at one end thereof diverging arms terminating in parallel portions adapted to straddle the pipe, removable means engaging the ends of the parallel portions for preventing escape of the pipe arranged therebetween, means for engaging a hoisting element with the shank intermediate the ends thereof, a flexible element engaged with the shank inwardly of the point of engagement with the hoisting element and means for engaging the flexible element with the shank at the outer end thereof comprising a hook at the outer end of the shank for the reception of said flexible element.

In testimony whereof I hereunto affix my signature.

WILLIAM H. CONKLIN.